(12) United States Patent
King et al.

(10) Patent No.: US 9,120,390 B2
(45) Date of Patent: Sep. 1, 2015

(54) APPARATUS FOR TRANSFERRING ENERGY USING ONBOARD POWER ELECTRONICS AND METHOD OF MANUFACTURING SAME

(75) Inventors: Robert Dean King, Schenectady, NY (US); Robert Louis Steigerwald, Burnt Hills, NY (US)

(73) Assignee: General Electric Company, Schenectady, NY (US)

( * ) Notice: Subject to any disclaimer, the term of this patent is extended or adjusted under 35 U.S.C. 154(b) by 666 days.

(21) Appl. No.: 13/414,800

(22) Filed: Mar. 8, 2012

(65) Prior Publication Data

US 2013/0234675 A1 Sep. 12, 2013

(51) Int. Cl.
B60L 11/18 (2006.01)
H02J 7/02 (2006.01)
H02J 7/04 (2006.01)
H02J 7/14 (2006.01)

(52) U.S. Cl.
CPC ............. *B60L 11/1814* (2013.01); *H02J 7/022* (2013.01); *H02J 7/041* (2013.01); *H02J 7/045* (2013.01); *H02J 7/1492* (2013.01); *B60L 2220/54* (2013.01); *Y02T 10/641* (2013.01); *Y02T 10/7005* (2013.01); *Y02T 10/7022* (2013.01); *Y02T 10/7033* (2013.01); *Y02T 10/92* (2013.01); *Y02T 90/127* (2013.01); *Y02T 90/14* (2013.01)

(58) Field of Classification Search
CPC ....................................................... H02J 7/008
USPC ........................................................ 320/163
See application file for complete search history.

(56) References Cited

U.S. PATENT DOCUMENTS

| | | | |
|---|---|---|---|
| 5,373,195 A | 12/1994 | De Doncker et al. | |
| 5,589,743 A | 12/1996 | King | |
| 5,903,449 A | 5/1999 | Garrigan et al. | |
| 6,331,365 B1 | 12/2001 | King | |
| 6,737,822 B2* | 5/2004 | King | 318/375 |
| 7,049,792 B2* | 5/2006 | King | 320/126 |
| 7,061,131 B2* | 6/2006 | King et al. | 290/40 C |
| 7,190,133 B2* | 3/2007 | King et al. | 318/375 |
| 7,499,296 B2 | 3/2009 | Baudesson et al. | |
| 7,595,597 B2* | 9/2009 | King et al. | 318/139 |
| 7,750,501 B2 | 7/2010 | Huang | |
| 7,932,633 B2* | 4/2011 | King et al. | 307/45 |
| 8,030,884 B2 | 10/2011 | King et al. | |
| 2002/0051368 A1 | 5/2002 | Ulinski et al. | |
| 2005/0235865 A1* | 10/2005 | Kumar | 105/61 |
| 2007/0012492 A1 | 1/2007 | Deng et al. | |
| 2011/0050173 A1* | 3/2011 | King et al. | 320/128 |
| 2011/0050174 A1* | 3/2011 | King et al. | 320/134 |
| 2011/0169449 A1* | 7/2011 | King et al. | 320/109 |
| 2011/0204854 A1* | 8/2011 | King et al. | 320/163 |

* cited by examiner

*Primary Examiner* — Samuel Berhanu
*Assistant Examiner* — Jerry D Robbins

(57) ABSTRACT

An apparatus for transferring energy using onboard power electronics comprises a first energy storage device configured to output a DC voltage and a DC bus coupled to the first energy storage device, the DC bus coupleable to a high-impedance voltage source. The apparatus also comprises a braking resistor coupled to the DC bus and to a control circuit, and a controller. The controller is configured to control the control circuit to cause energy on the DC bus to be dissipated through the braking resistor during a regenerative braking event, cause the first energy storage device to receive a charging energy from the high-impedance voltage source through the braking resistor during a charging event, and after a threshold value has been crossed, cause the first energy storage device to receive the charging energy from the high-impedance voltage source bypassing the braking resistor during the charging event.

22 Claims, 6 Drawing Sheets

APPARATUS FOR TRANSFERRING ENERGY USING ONBOARD POWER ELECTRONICS AND METHOD OF MANUFACTURING SAME

BACKGROUND OF THE INVENTION

Embodiments of the invention relate generally to electric drive systems including hybrid and electric vehicles and to stationary drives that are subject to transient or pulsed loads and, more particularly, to transferring energy between an electrical storage device of the vehicle or drive and a power source external to the vehicle or drive.

Hybrid electric vehicles may combine an internal combustion engine and an electric motor powered by an energy storage device, such as a traction battery, to propel the vehicle. Such a combination may increase overall fuel efficiency by enabling the combustion engine and the electric motor to each operate in respective ranges of increased efficiency. Electric motors, for example, may be efficient at accelerating from a standing start, while combustion engines may be efficient during sustained periods of constant engine operation, such as in highway driving. Having an electric motor to boost initial acceleration allows combustion engines in hybrid vehicles to be smaller and more fuel efficient.

Purely electric vehicles use stored electrical energy to power an electric motor, which propels the vehicle and may also operate auxiliary drives. Purely electric vehicles may use one or more sources of stored electrical energy. For example, a first source of stored electrical energy may be used to provide longer-lasting energy while a second source of stored electrical energy may be used to provide higher-power energy for, for example, acceleration.

Plug-in electric vehicles, whether of the hybrid electric type or of the purely electric type, are configured to use electrical energy from an external source to recharge the traction battery. Such vehicles may include on-road and off-road vehicles, golf cars, neighborhood electric vehicles, forklifts, and utility trucks as examples. These vehicles may use either off-board stationary battery chargers or on-board battery chargers to transfer electrical energy from a utility grid or renewable energy source to the vehicle's on-board traction battery. Plug-in vehicles may include circuitry and connections to facilitate the recharging of the fraction battery from the utility grid or other external source, for example. The battery charging circuitry, however, may include dedicated components such as boost converters, high-frequency filters, choppers, inductors, and other electrical components dedicated only to transferring energy between the on-board electrical storage device and the external source. These additional dedicated components add extra cost and weight to the vehicle.

It would therefore be desirable to provide an apparatus to facilitate the transfer of electrical energy from an external source to the on-board electrical storage device of a plug-in vehicle that reduces the number of components dedicated only to transferring energy between the on-board electrical storage device and the external source.

BRIEF DESCRIPTION OF THE INVENTION

According to an aspect of the invention, an apparatus comprises a first energy storage device configured to output a DC voltage and a DC bus coupled to the first energy storage device, the DC bus coupleable to a high-impedance voltage source. The apparatus also comprises a braking resistor coupled to the DC bus and to a control circuit, and a controller. The controller is configured to control the control circuit to cause on the DC bus to be dissipated through the braking resistor during a regenerative braking event, cause the first energy storage device to receive a charging energy from the high-impedance voltage source through the braking resistor during a charging event, and after a threshold value has been crossed, cause the first energy storage device to receive the charging energy from the high-impedance voltage source bypassing the braking resistor during the charging event.

According to another aspect of the invention, a method of fabricating an energy transfer system for transferring energy between an energy storage device on-board a vehicle and an external source comprises coupling the energy storage device to a voltage bus, the energy storage device configured to output a DC voltage, coupling a regenerative braking dissipation circuit to the voltage bus, and coupling a high-impedance voltage source to the voltage bus to supply current to the energy storage device. The method also comprises configuring a controller to cause the control circuit to dissipate energy on the voltage bus through a resistor of the regenerative braking dissipation circuit during a regenerative braking event, cause the first energy storage device to receive the current from the high-impedance voltage source via the resistor during a first stage of a charging event, and cause the first energy storage device to receive the current from the high-impedance voltage source bypassing the resistor during a second stage of the charging event.

According to yet another aspect of the invention, a system comprises a DC bus configured to receive charging energy from a high-impedance voltage source, an energy storage device configured to output a DC voltage and coupled to the DC bus, and a resistor coupled to the DC bus. A controller is configured to cause energy on the DC bus to pass through the resistor during a regenerative braking event, to cause the energy storage device to receive a charging energy from the high-impedance voltage source through the resistor during a charging event, and to cause the energy storage device to receive the charging energy from the high-impedance voltage source bypassing the resistor after a time threshold has been crossed during the charging event.

Various other features and advantages will be made apparent from the following detailed description and the drawings.

BRIEF DESCRIPTION OF THE DRAWINGS

The drawings illustrate embodiments presently contemplated for carrying out the invention.

In the drawings.

DETAILED DESCRIPTION

Figure 1:
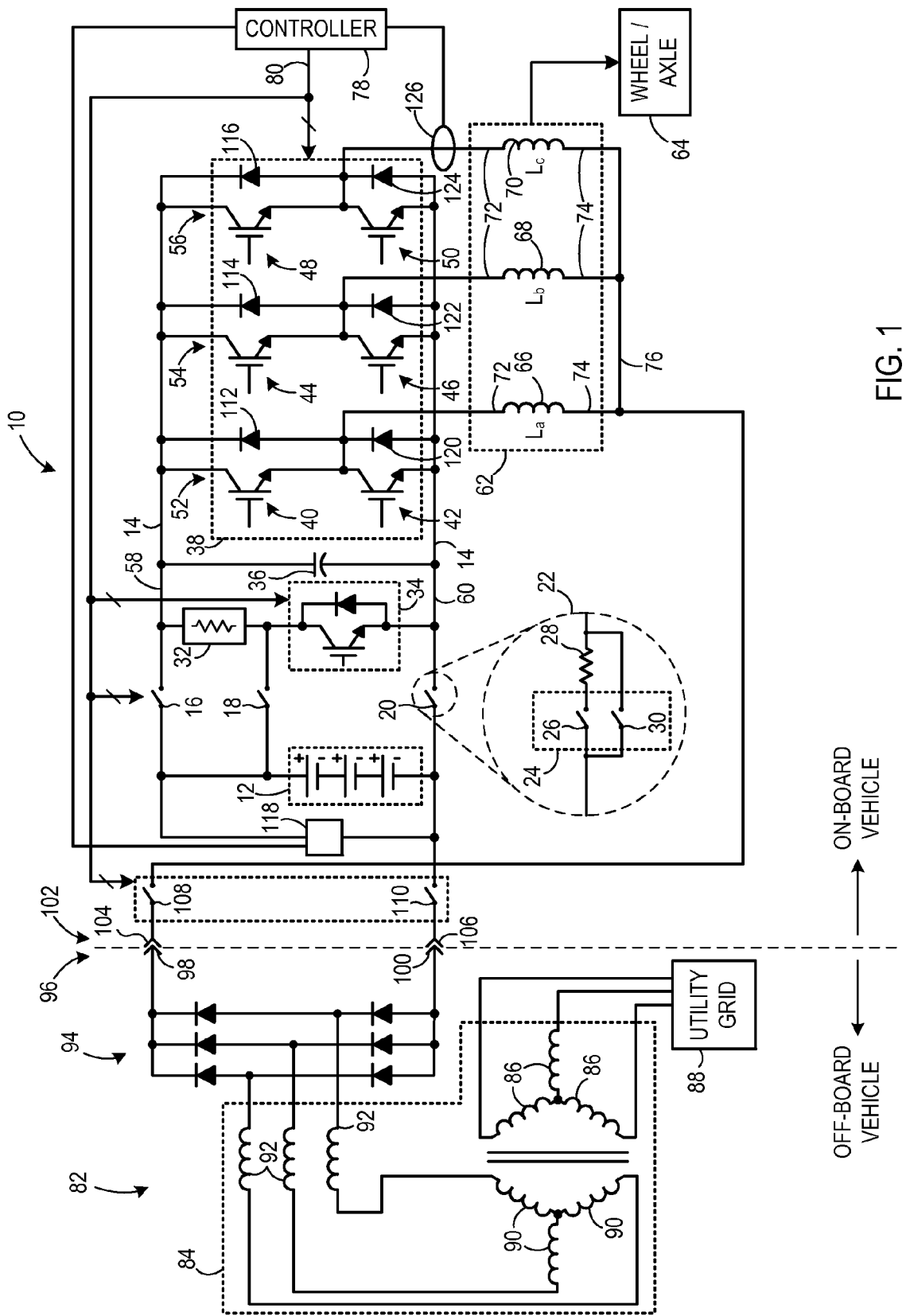
FIG. 1 is a schematic diagram of a traction system according to an embodiment of the invention.

FIG. 1 is a schematic diagram of a traction system 10 according to an embodiment of the invention. Traction system 10 includes a first energy storage device 12. In one embodiment, first energy storage device 12 is a high-voltage energy storage device and may be a battery, a flywheel system, fuel cell, an ultracapacitor, or the like. First energy storage device 12 is coupleable to a DC link or bus 14 via an array of contactors or switches 16, 18, 20. As described below, switches 16-20 are controlled during operation of traction system 10 in a motoring mode and in a recharging mode.

In one embodiment as shown in further detail at 22, switch 20 may include a switch array 24 coupled between first energy storage device 12 and DC bus 14. Switch array 24 includes a first switch 26 coupled in series with a pre-charge resistor 28. A second switch 30 is coupled in parallel with first switch 26 and pre-charge resistor 28. When switch 26 is closed and switch 30 is open, current flowing through switch 26 is directed to flow through pre-charge resistor 28. When switch 30 is closed and switch 26 is open, current flowing through switch 30 is directed to bypass pre-charge resistor 28. Switches 16, 18 may also include that shown in detail 22.

Traction system 10 includes a resistor bank 32 having one or more resistors coupled to switches 16-20 and to one or more control circuits 34 that are controllable during a regenerative braking event to dissipate energy on DC bus 14 not used for recharging first energy storage device 12 or other energy storage devices of traction system 10. Resistor bank 32 and control circuit 34 form a regenerative braking dissipation circuit. The regenerative braking function during operation of resistor bank 32 and control circuit provides protection of an overvoltage of the DC link and associated components, in the event that the respective energy storage device 12 or other energy storage devices of traction system 10 are not able to accept all of the regenerative energy being applied to the DC link. A DC link filter capacitor 36 coupled to DC bus 14 provides a smoothing function for DC bus 14 and filters high-frequency currents on DC bus 14.

A bi-directional voltage modification assembly 38 is coupled to DC bus 14 and may be coupled to first energy storage device 12 via switches 16-20. In one embodiment, bi-directional voltage modification assembly 38 is a bi-directional DC-to-AC voltage inverter. Bi-directional DC-to-AC voltage inverter 38 includes six half phase modules 40, 42, 44, 46, 48, and 50 that are paired to form three phases 52, 54, and 56. Each phase 52, 54, 56 is coupled to a pair of conductors 58, 60 of DC bus 14. An electromechanical device or motor 62 is coupled to bi-directional DC-to-AC voltage inverter 38. In one embodiment, electromechanical device 62 is a traction motor mechanically coupled to one or more driving wheels or axles 64 of a vehicle (not shown) or other electrical apparatus including cranes, elevators, or lifts. Electromechanical device 62 includes a plurality of windings 66, 68, and 70 having a plurality of conductors 72 coupled to respective phases 52, 54, 56 of bi-directional DC-to-AC voltage inverter 38. Windings 66-70 also have a plurality of conductors 74 coupled together to form a common or neutral node 76.

Traction system 10 includes a controller 78 coupled to half phase modules 40-50 via lines 80. In a motoring mode, controller 78 controls switches 16, 20 to a closed state and switch 18 to an open state such that energy from first energy storage device 12 is transferred to DC bus 14. Through appropriate control of half phase modules 40-50, controller 78 is configured to control bi-directional DC-to-AC voltage inverter 38 to convert a DC voltage or current on DC bus 14 to an AC voltage or current for supply to windings 66-70 via conductors 72. Accordingly, the DC voltage or current from first energy storage device 12 may be transferred to DC bus 14 and converted into an AC voltage or current and delivered to motor 62 to drive wheels 64. In other non-vehicle propulsion systems, the drive wheels 64 may be another type of load (not shown), including a pump, fan, winch, crane, or other motor driven loads. In a regenerative braking mode, electromechanical device 62 may be operated as a generator to brake wheels 64 and to supply AC voltage or current to bi-directional DC-to-AC voltage inverter 38 for inversion into a DC voltage or current onto DC bus 14 that is suitable for recharging first energy storage device 12.

When a vehicle or apparatus incorporating traction system 10 is parked or not in use, it may be desirable to plug the vehicle into, for example, the utility grid or to a renewable energy source to refresh or recharge energy storage device 12. Accordingly, FIG. 1 shows an embodiment of the invention including a charging system 82 coupled to traction system 10 for the recharging of energy storage device 12 such that components of traction system 10 may be used for the dual purposes of recharging energy storage device 12 during the recharging mode and converting energy from energy storage device 12 into energy usable to drive the load or propel the vehicle during the motoring mode.

Charging system 82 includes an external, high-impedance voltage source 84 having a plurality of primary windings 86 coupled to a source such as the utility grid 88 as shown and includes a plurality of secondary windings 90 coupled a plurality of inductors 92. Charging system 82 also includes a rectifier 94 coupled to inductors 92 and a receptacle or plug 96 having contacts 98, 100 coupled to rectifier 94. While external high-impedance voltage source 84 is shown as a poly-phase utility system in FIGS. 1-5 having three phases, it is contemplated that the external, high-impedance poly-phase source could instead have one, two, six, or any other number of phases. It is contemplated that interface to utility grid 88 could be a conventional 480/208 V service transformer. Alternatively, the interface to the utility grid 88 could be a "medium voltage" for example 2.4 kV, 8 kV, 13.8 kV, or higher voltage that may combine the pole mount distribution transformer with the 480 V or 208 V secondary service transformer, thus further reducing the size, weight, and cost of transformer components while increasing efficiency of transmitting electric power from the grid for fast charging.

Plug 96 is configured to mate with a plug 102 of traction system 10 having contacts 104, 106. Plug 102 is coupleable to node 76 via a pair of contactors or switches 108, 110 that allow energy from traction system 10 to be disconnected from plug 102 when no charging system 82 is attached thereto. Each winding 66-70 of motor 62 provides filtering for the charging energy supplied by high-impedance voltage source 84.

In a charging or recharging mode of operation, charging energy, such as current or voltage, from high-impedance voltage source 84 is used to recharge first energy storage device 12. Prior to closing switches 108, 110 of plug 102 to allow energy from the utility grid 88 to enter into traction system 10, controller 78 may cause switches 18, 20 to close to cause a voltage from first energy storage device 12 to pre-charge the filter capacitor 36. In one embodiment, the pre-charging of filter capacitor 36 may also include closing first switch 26 of switch 20 such that the voltage from first energy storage device 12 passes through both pre-charge resistor 28 of switch 20 and through one or more resistors of resistor bank 32.

After filter capacitor 36 has been pre-charged and handshaking and safety circuits (not shown) indicate that no faults are present, controller 78 closes switches 108, 110 of plug 102 to allow energy from the utility grid 88 to enter into traction system 10. Alternatively, the Electric Vehicle Service Equipment (EVSE) shown in block 84 may also have a set of multi-phase contactors (not shown) that are controlled through a combination of handshaking communication with controller 78 prior to energizing the contacts 98, 100. Rectifier 94 rectifies the AC energy from high-impedance voltage source 84, and delivers the rectified charging energy to windings 66-70 and half phase modules 40, 44, 48, which transfer the charging energy to DC bus 14. Note that there is also no motor shaft movement in the embodiment of FIG. 1 due to the winding currents since the same DC current is supplied to all windings through neutral node 76 and since controller 78 may be configured to control each phase 52, 54, and 56 to supply the correct current, resulting in substantially zero net torque being produced.

During a first stage of the recharging operation, the charging energy from DC bus 14 is supplied to first energy storage device 12 having an initial low state-of-charge (SOC) through resistor bank 32. Switches 18, 20 are closed if they have not already been closed to pre-charge in the filter capacitor 36 as described above. If present, second switch 30 of switch 20 may be closed, and first switch 26 may be opened to prevent the charging energy from flowing through pre-charge resistor 28. Diodes 112, 114, 116 of respective half phase modules 40, 44, 48 deliver the charging energy from windings 66-70 to DC bus 14. The charging energy from DC bus 14 flows through one or more resistors of resistor bank 32 and into first energy storage device 12. The charging energy is limited at least by an impedance of high-impedance voltage source 84 and by the one or more resistors of resistor bank 32.

In one embodiment, controller 78 is programmed to maintain the first stage of recharging for a period of time. The period of time may be predetermined and may be based, for example, on the amount of time that first energy storage device 12 takes to be charged to a first threshold value based on a minimum SOC. Alternatively, the period of time may be dynamically based on the current SOC of first energy storage device 12 when the recharging mode of operation begins. For example, controller 78 may determine the SOC of first energy storage device 12 via a voltage sensor 118 coupled thereto to determine the time it will take first energy storage device 12 to reach an SOC capable of allowing the second stage of recharging to begin. Alternatively, the SOC of the energy storage device may be communicated to controller 78 through a dedicated Battery Management Interface (BMI) unit (not shown) that could be contained within the energy storage device 12. In addition, based on the determined SOC of first energy storage device 12 at the time of initial recharging, controller 78 may determine that the SOC of first energy storage device 12 is already above the first threshold value and may thus eliminate the first stage of recharging altogether.

When the period of time for the first stage has elapsed, controller 78 closes switch 16 (i.e., second switch 30 of switch 16 if present) and opens switch 18 to allow the charging energy to flow directly into first energy storage device 12 from DC bus 14 and to eliminate the power loss through the resistor(s) 32 during a second stage of the recharging mode of operation. The charging energy from DC bus 14 flows into first energy storage device 12, which, in one embodiment, has an instantaneous acceptance capability that is larger than an instantaneous delivery capability of the high-impedance voltage source 84. The charging energy is limited at least by an impedance of high-impedance voltage source 84. Diodes 112-116 are rated to allow current from the high impedance voltage source 84 to flow directly from them into first energy storage device 12 during the second stage. In this embodiment, diodes 120, 122, 124 of respective half phase modules 42, 46, 50 are not configured to supply charging energy from first energy storage device 12 to the DC bus 14. Accordingly, diodes 120-124 may have a lower current rating than diodes 112-116 and may, therefore, allow for reduced costs of traction system 10.

During the second stage, controller 78 is programmed or configured to monitor the charging energy supplied to first energy storage device 12. Since, in one embodiment, current of the charging energy during the first stage is greater than the current ratings of the components of bi-directional DC-to-AC voltage inverter 38 except for diodes 112-116, the charging energy flows only through diodes 112-116 during the first stage. As the voltage rises in first energy storage device 12, charging current tapers back. Controller 78 is configured to monitor the current of the charging energy via a current sensor 126. While shown as sensing current flow between winding 70 and diode 116, it is contemplated that current sensor 126 may be placed anywhere in traction system 10 such that current from the charging energy source may be sensed.

Controller 78 compares the monitored charging energy current to a second threshold value. In one embodiment, the second threshold value is a value of the charging energy current that falls within a current rating of all the components of bi-directional DC-to-AC voltage inverter 38. The first threshold value may also be based on a design and a temperature of first energy storage device 12. Once controller 78 detects that the second threshold value has been crossed, controller 78 begins active control of bi-directional DC-to-AC voltage inverter 38 during a third stage of the recharging operation. In this manner, recharging of first energy storage device 12 during the second stage allows for rapid charging that is limited primarily via the impedance of high-impedance voltage source 84. During the third stage, charging is controlled due to the components of bi-directional voltage modification assembly 38.

During the third stage, controller 78 controls half phase modules 40-50 in parallel to boost the current and/or voltage of the charging energy supplied thereto such that first energy storage device 12 may be recharged to a voltage greater than that allowable through direct recharging via high-impedance voltage source 84 without boosting. Respective pairs of half phase modules 40-42, 44-46, 48-50 form individual boost converters that may operate at the same phase to reduce or eliminate high-frequency torque ripple in motor 62. Furthermore, windings 66-70 act as boost inductors during the boosting operations.

Controller 78 senses a voltage of first energy storage device 12 via a voltage sensor 118 and regulates charging of first energy storage device 12 such that its voltage does not exceed a specified level. Near the end of charging, controller 78 also regulates the recharging voltage on DC bus 14 to a "float voltage" as the recharging current tapers to low levels.

In a motoring mode of operation, energy from energy storage device 12 is used to power motor 62 to turn wheels 64 or another device connected to motor 62. Prior to transferring energy from DC bus 14 to motor 62 via bi-directional voltage modification assembly 38, controller 78 may cause first switch 26 of switch 16 or switch 20, if present, to pre-charge filter capacitor 36 if necessary. To transfer energy from DC bus 14 to motor 62, controller 78 ensures that switch 18 is open and switches 16, 20 (or second switches 30 thereof) are closed and operates DC-to-AC voltage inverter 38 to invert a DC voltage from first energy storage device 12 on DC bus 14 into an AC voltage for operating motor 62.

In a regenerative braking mode of operation, controller 78 may be configured to operate motor 62 in a regenerative mode, wherein electric power or energy is returned to DC link 14 through DC-to-AC inverter 38 during a regenerative braking event. In this regenerative braking mode, controller 78 may cause regenerative power or energy to partially or fully replenish first energy storage device 12 directly coupled on DC link 14. If the ability of first energy storage device 12 to accept a high level of charging exists, switches 16 and 20, in a closed state, allow all of the regenerative energy to be supplied to first energy storage device 12 if desired. As the ability of first energy storage device 12 to accept a high level of charging diminishes, controller 78 may control the control circuit 34 coupled to resistor bank 32 such that a portion of the remaining energy on DC bus 14 during the regenerative braking event may be dissipated through the resistors of resistor bank 32. In this manner, some, but not all, of the energy is still supplied to first energy storage device 12. Controller 78 may open at least switch 16 when first energy storage device 12 is fully charged.

Figure 2:
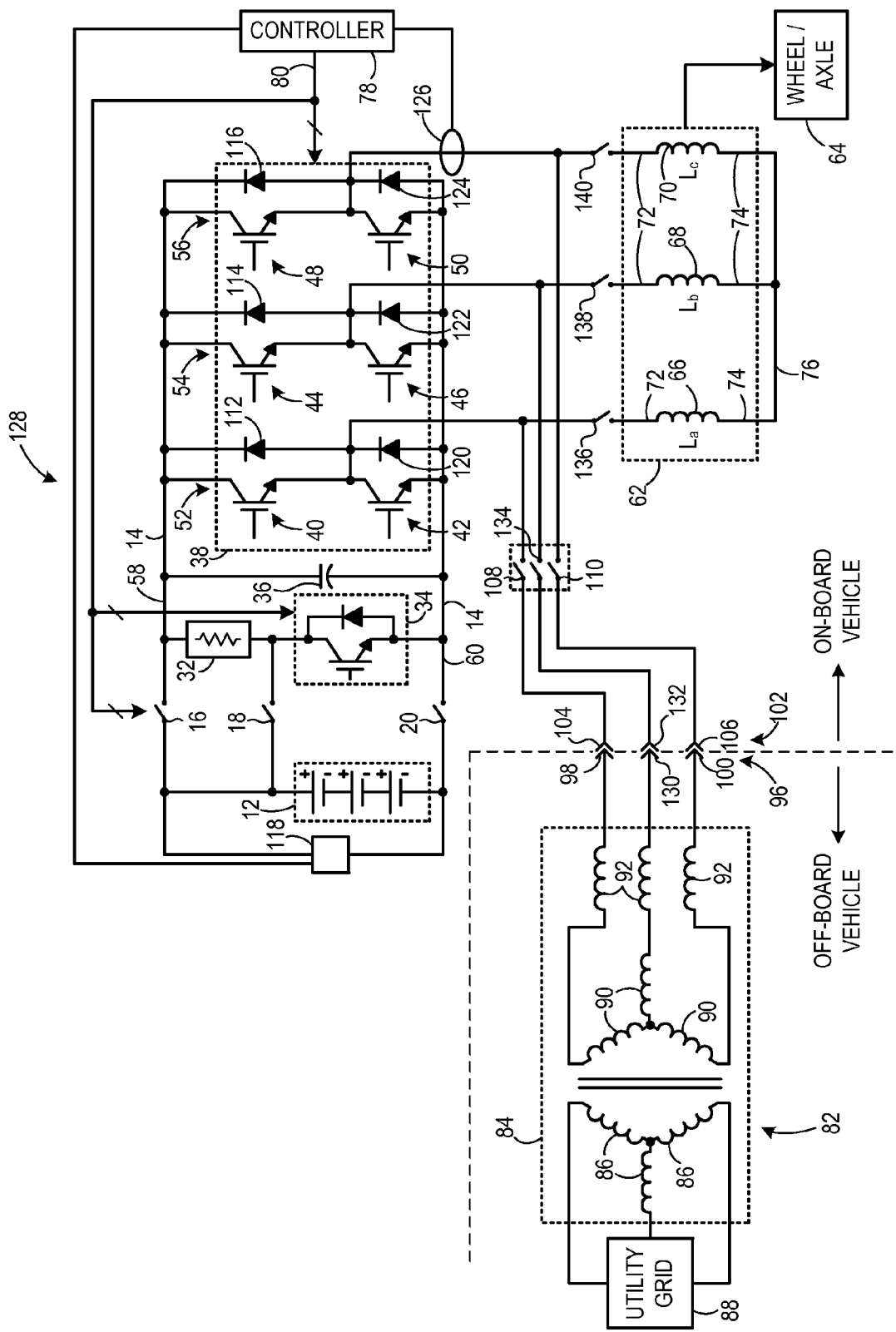
FIG. 2 is a schematic diagram of another traction system according to an embodiment of the invention.

FIG. 2 illustrates a schematic diagram of a traction system 128 according to another embodiment of the invention. Elements and components common to traction systems 10 and 128 will be discussed relative to the same reference numbers as appropriate.

As shown in FIG. 2, high-impedance voltage source 84 is directly coupleable to DC-to-AC inverter 38 without rectifier 94 as shown in FIG. 1 and without using windings 66-70 of motor 62. In this embodiment, diodes 112-124 of bi-directional voltage modification assembly 38 rectify the charging energy from charging system 82 into a DC voltage for supply to DC bus 14. To connect the three phases of high-impedance voltage source 84 as shown to DC-to-AC inverter 38, receptacles 96, 102 include a third pair of mating contacts 130, 132 coupled to a third contactor or switch 134 that is controlled by controller 78 together with switches 108, 110 during the recharging mode. Conductors 72 of windings 66-70 are also decoupled from DC-to-AC inverter 38 during the recharging mode via a plurality of contractors or switches 136, 138, 140.

During the recharging mode of operation, controller 78 is programmed similarly as that described above regarding the control of switches 18, 20 to pre-charge filter capacitor 36 for the first stage. In addition to controlling the second stage similarly to that described above, controller 78 opens switches 136-140 to decouple motor 62 from the charging energy to avoid rotational movement in motor 62. During the third stage, controller 78 controls half phase modules 40-50 as an active rectifier to complete the charging of first energy storage device 12.

During the motoring and regenerative braking modes of operation, controller 78 may be programmed similarly to that described above with respect to traction system 10.

Figure 3A:
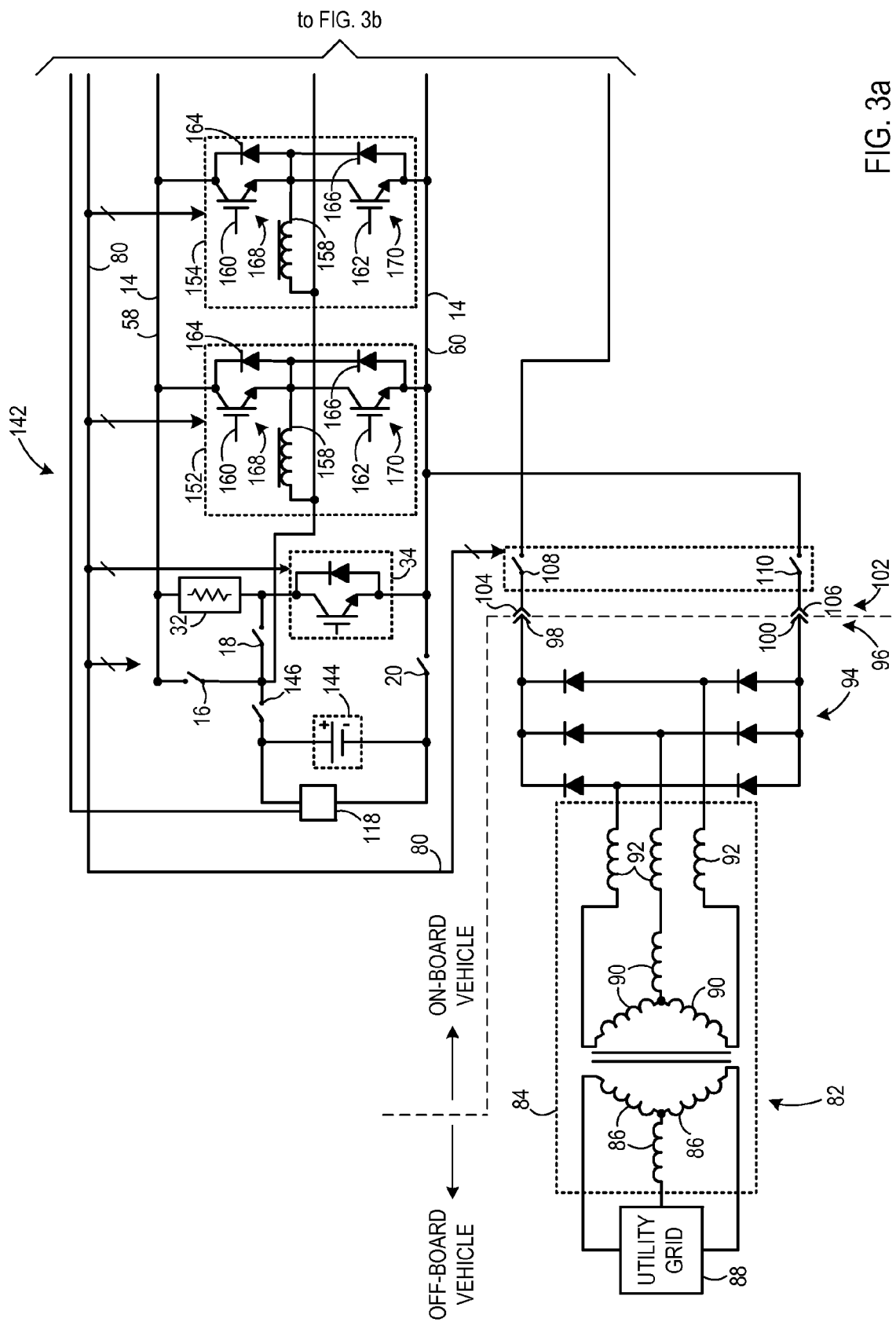
FIGS. 3a and 3b are a schematic diagram of another traction system according to an embodiment of the invention.
Figure 3B:
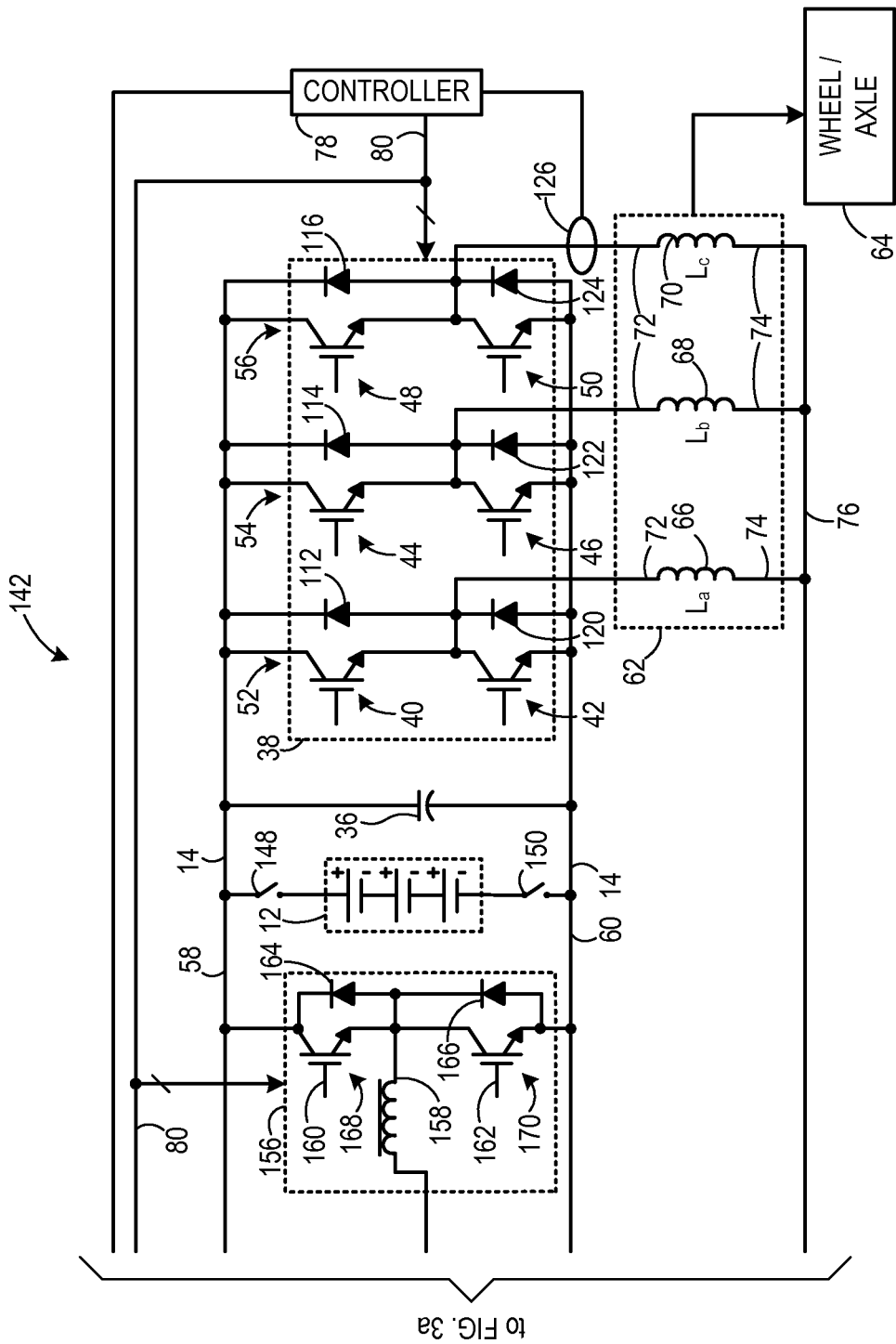

FIGS. 3a and 3b show a schematic diagram of a fraction system 142 according to another embodiment of the invention. Elements and components common to traction systems 10, 128, and 142 will be discussed relative to the same reference numbers as appropriate. FIGS. 3a and 3b will also discuss common components of traction system 142 relative to the same reference numbers. In addition to the components common with traction system 10, 128, traction system 142 includes a second energy storage device 144 coupleable to DC bus 14 to provide power to drive wheels 64. In one embodiment, second energy storage device 144 is a low-voltage energy storage device and may be a battery, a fuel cell, an ultracapacitor, or the like. First energy storage device 12 may be configured to provide a higher power than second energy storage device 144 to provide power during, for example, acceleration periods of the vehicle. Second energy storage device 144 may be configured to provide a higher energy than first energy storage device 12 to provide a longer-lasting power to the vehicle to increase a travelling distance thereof. Maximum operating voltage of the second energy storage device 144 is designed to be lower than the minimum operating voltage of the first energy storage device 12.

Second energy storage device 144 is coupleable to DC bus 14 or to resistor bank 32 via switches 16-20 and via another switch 146. Switch 146 may include a switch array 24 such as that shown in detail 22 of FIG. 1. Another pair of switches switch 148, 150 allows first energy storage device 12 to be coupled to or decoupled from DC bus 14.

A plurality of bi-directional DC-to-DC voltage converters 152, 154, 156 are coupled to second energy storage device 144 and to DC bus 14 and are configured to convert one DC voltage into another DC voltage. Each bi-directional DC-to-DC voltage converter 152-156 includes an inductor 158 coupled to a pair of switches 160, 162 and coupled to a pair of diodes 164, 166. Each switch 160, 162 is coupled to a respective diode 164, 166, and each switch/diode pair forms a respective half phase module 168, 170. Switches 160, 162 are shown, for illustrative purposes, as insulated gate bipolar transistors (IGBTs). However, embodiments of the invention are not limited to IGBTs. Any appropriate electronic switch can be used, such as, for example, metal oxide semiconductor field effect transistors (MOSFETs), bipolar junction transistors (BJTs), and metal oxide semiconductor controlled thyristors (MCTs).

Controller 78 is coupled to bi-directional DC-to-DC voltage converters 152-156 via lines 80, and energy supplied via second energy storage device 144 is boosted by control of switches 160, 162 of bi-directional DC-to-DC voltage converters 152-156 to supply the higher voltage to DC bus 14. The energy supplied via second energy storage device 144 to DC bus 14 is boosted via bi-directional DC-to-AC voltage inverter 38 and supplied to motor 62 during a "motoring mode". Similarly, energy generated during a regenerative braking mode may also be used to partially recharge second energy storage device 144 via bi-directional DC-to-AC voltage inverter 38 and via bucking control of switches 160, 162 of bi-directional DC-to-DC voltage converters 152-156.

As shown in FIGS. 3a and 3b, charging system 82 is coupleable to DC bus 14 via switches 108, 110, motor 62, and DC-to-AC inverter 38. In a first stage of a recharging operation, controller 78 may cause switches 148, 150 to decouple first energy storage device 12 from DC bus 14 and may cause switches 18, 20, and 146 to close to cause a voltage from second energy storage device 144 to pre-charge the filter capacitor 36. In one embodiment, the pre-charging of filter capacitor 36 may also include closing first switch 26 of switch 20 such that the voltage from second energy storage device 144 passes through both pre-charge resistor 28 of switch 20 or switch 146 and through one or more resistors of resistor bank 32.

After filter capacitor 36 has been pre-charged and other conditions are met, controller 78 closes switches 108, 110 of plug 102 to allow energy from the utility grid 88 to enter into traction system 10. Rectifier 94 rectifies the AC energy from high-impedance voltage source 84, and delivers the rectified charging energy to windings 66-70 and half phase modules 40, 44, 48, which transfer the charging energy to DC bus 14.

During a first stage of the recharging operation, the charging energy from DC bus 14 is supplied to second energy storage device 144 having an initial low state-of-charge (SOC) through resistor bank 32. Switches 18, 20, and 146 are closed if they have not already been closed to pre-charge in the filter capacitor 36 as described above. If present, second switch 30 of switch 20 or 146 may be closed, and first switch 26 may be opened to prevent the charging energy from flowing through pre-charge resistor 28. Diodes 112-116 of respective half phase modules 40, 44, 48 deliver the charging energy from windings 66-70 to DC bus 14. The charging energy from DC bus 14 flows through one or more resistors of resistor bank 32 and into second energy storage device 144. The charging energy is limited at least by an impedance of high-impedance voltage source 84 and by the one or more resistors of resistor bank 32.

In one embodiment, controller 78 is programmed to maintain the first stage of recharging for a period of time similar to that described above with respect to traction system 10. The period of time may be predetermined and may be based, for example, on the amount of time that second energy storage device 144 takes to be charged to a first threshold value based on a minimum SOC. Alternatively, the period of time may be dynamically based on the current SOC of second energy storage device 144 when the recharging mode of operation begins. For example, controller 78 may determine the SOC of second energy storage device 144 via a voltage sensor 118 coupled thereto to determine the time it will take second energy storage device 144 to reach an SOC capable of allowing the second stage of recharging to begin. Alternatively, the SOC of the energy storage device maybe communicated to controller 78 through a dedicated Battery Management Interface (BMI) unit (not shown) that could be contained within the energy storage device 144. In addition, based on the determined SOC of second energy storage device 144 at the time of initial recharging, controller 78 may determine that the SOC of second energy storage device 144 is already above the first threshold value and may thus eliminate the first stage of recharging altogether.

When the period of time for the first stage has elapsed, or the SOC is above a predetermined threshold, controller 78 closes switch 16 (i.e., second switch 30 of switch 16 if present) and opens switch 18 to allow the charging energy to flow directly into second energy storage device 144 from DC bus 14 and to eliminate the power loss through the resistor(s) 32 during a second stage of the recharging mode of operation. Second energy storage device 144 may have an instantaneous acceptance capability that is larger than the instantaneous delivery capability of the high-impedance voltage source 84 in one embodiment. Diodes 112-116 are rated to allow current from the high impedance voltage source 84 to flow directly from them into second energy storage device 144 during the second stage. In this embodiment, diodes 120-124 of respective half phase modules 42, 46, 50 are not configured to supply charging energy from first energy storage device 12 to the DC bus 14. Accordingly, diodes 120-124 may have a lower current rating than diodes 112-116 and may, therefore, allow for reduced costs of traction system 10.

During the second stage, controller 78 is programmed or configured to monitor the charging energy supplied to second energy storage device 144. Since, in one embodiment, current of the charging energy during the first stage is greater than the current ratings of the components of bi-directional DC-to-AC voltage inverter 38 except for diodes 112-116, the charging energy flows only through diodes 112-116 during the first stage. As the voltage rises in second energy storage device 144, charging current tapers back. Controller 78 is configured to monitor the current of the charging energy via current sensor 126. While shown as sensing current flow between winding 70 and diode 116, it is contemplated that current sensor 126 may be placed anywhere in traction system 142 such that current from the charging energy source may be sensed.

Controller 78 compares the monitored charging energy current to a second threshold value. In one embodiment, the second threshold value is a value of the charging energy current that falls within a current rating of all the components of bi-directional DC-to-AC voltage inverter 38. The first threshold value may also be based on a design and a temperature of second energy storage device 144. Once controller 78 detects that the second threshold value has been crossed, controller 78 opens switch 16 and begins active control of bi-directional DC-to-AC voltage inverter 38 during a third stage of the recharging operation. In this manner, recharging of second energy storage device 144 during the second stage allows for rapid charging that is limited primarily via the impedance of high-impedance voltage source 84.

During the third stage, charging is controlled due to the components of bi-directional voltage modification assembly 38 and the components of one or more of bi-directional DC-to-DC voltage converters 152-156. In this stage, controller 78 may open switch 16 and control half phase modules 40-50 in parallel to boost the current and/or voltage of the charging energy supplied thereto. Respective pairs of half phase modules 40-42, 44-46, 48-50 form individual boost converters that may operate at the same phase to reduce or eliminate high-frequency torque ripple in motor 62. Furthermore, windings 66-70 act as boost inductors during the boosting operations. Controller 78 also controls one or more of bi-directional DC-to-DC voltage converters 152-156 to buck the voltage on DC bus 14 for supply to second energy storage device 144.

Controller 78 senses a voltage of second energy storage device 144 via voltage sensor 118 and regulates charging thereof such that its voltage does not exceed a specified level. Near the end of charging, controller 78 may regulate the recharging voltage to a "float voltage" as the recharging current tapers to low levels. In addition, first energy storage device 12 may be recharged before, after, or simultaneously with the charging of second energy storage device 144 through appropriate control of switches 148, 150. For example, switches 148, 150 may be closed after energy storage device 144 exceeds a threshold value for example of SOC, or voltage, or a predetermined length of time.

In a motoring mode of operation, energy from second energy storage device 144 and from energy storage device 12 (if present) is used to power motor 62 to turn wheels 64 or another device connected to motor 62. Prior to transferring energy from DC bus 14 to motor 62 via bi-directional voltage modification assembly 38, controller 78 may cause first switch 26 of switch 16 or switch 20, if present, to pre-charge filter capacitor 36 if necessary. To transfer energy from DC bus 14 to motor 62, controller 78 ensures that switches 16, 18 are open and switches 146, 20 (or second switches 30 thereof) are closed and operates bi-directional DC-to-DC voltage converters 152-156 to boost the voltage from second energy storage device 144 and to deliver the boosted voltage to DC bus 14. Controller 78 may then control DC-to-AC voltage inverter 38 to invert a DC voltage from first energy storage device 12 on DC bus 14 into an AC voltage for operating motor 62. Controller 78 may also control switches 148, 150 during acceleration events, for example, to provide additional power to motor 62.

In a regenerative braking mode of operation, controller 78 may be configured to control switches 148, 150 to provide power or energy to partially or fully replenish first energy storage device 12 directly coupled on DC link 14 similarly to that described above. To replenish second energy storage device 144 simultaneously with first energy storage device 12, controller 78 may be programmed to buck the regenerative voltage on DC bus 14 via bi-directional DC-to-DC voltage converters 152-156 and supply the bucked voltage to second energy storage device 144, ensuring that switches 16, 18 are open.

As first and second energy storage devices 12, 144 near their fully-charged state or their ability to accept a high level of charging diminishes, controller 78 may control the control circuit 34 coupled to resistor bank 32 such that a portion of the remaining energy on DC bus 14 during the regenerative braking event may be dissipated through the resistors of resistor bank 32, leaving a reduced amount of energy on DC link 14 for directly charging first and second energy storage devices 12, 144.

When recharging of storage devices 12, 144 is finished, controller 78 may open switch 148 and cease bucking operation of bi-directional DC-to-DC voltage converters 152-156 to prevent further charging of storage devices 12, 144. Remaining energy on DC bus 14 during the regenerative braking event may be dissipated through the resistors of resistor bank 32 via control of the control circuit 34 coupled thereto.

Figure 4A:
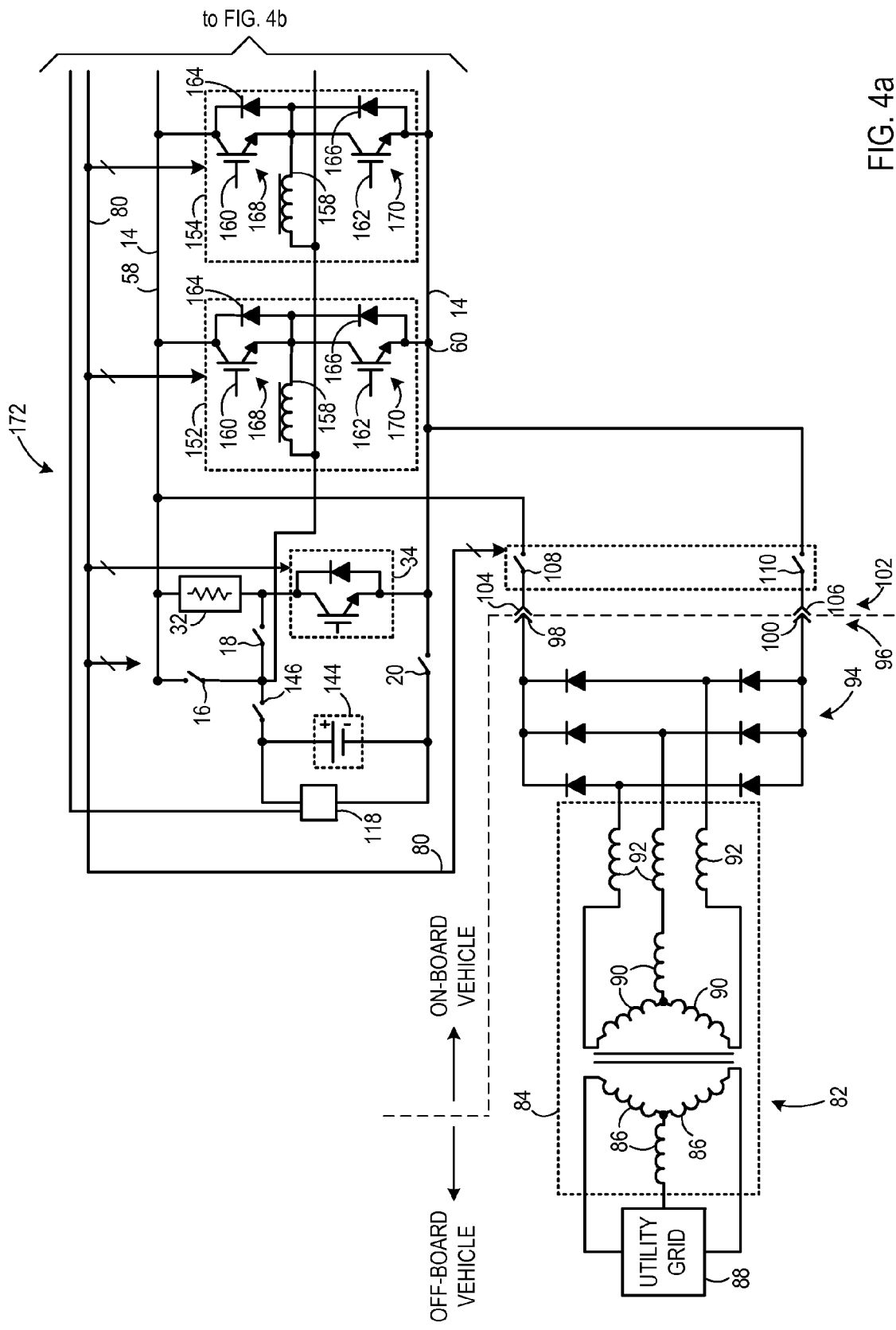
FIGS. 4a and 4b are a schematic diagram of another traction system according to an embodiment of the invention.
Figure 4B:
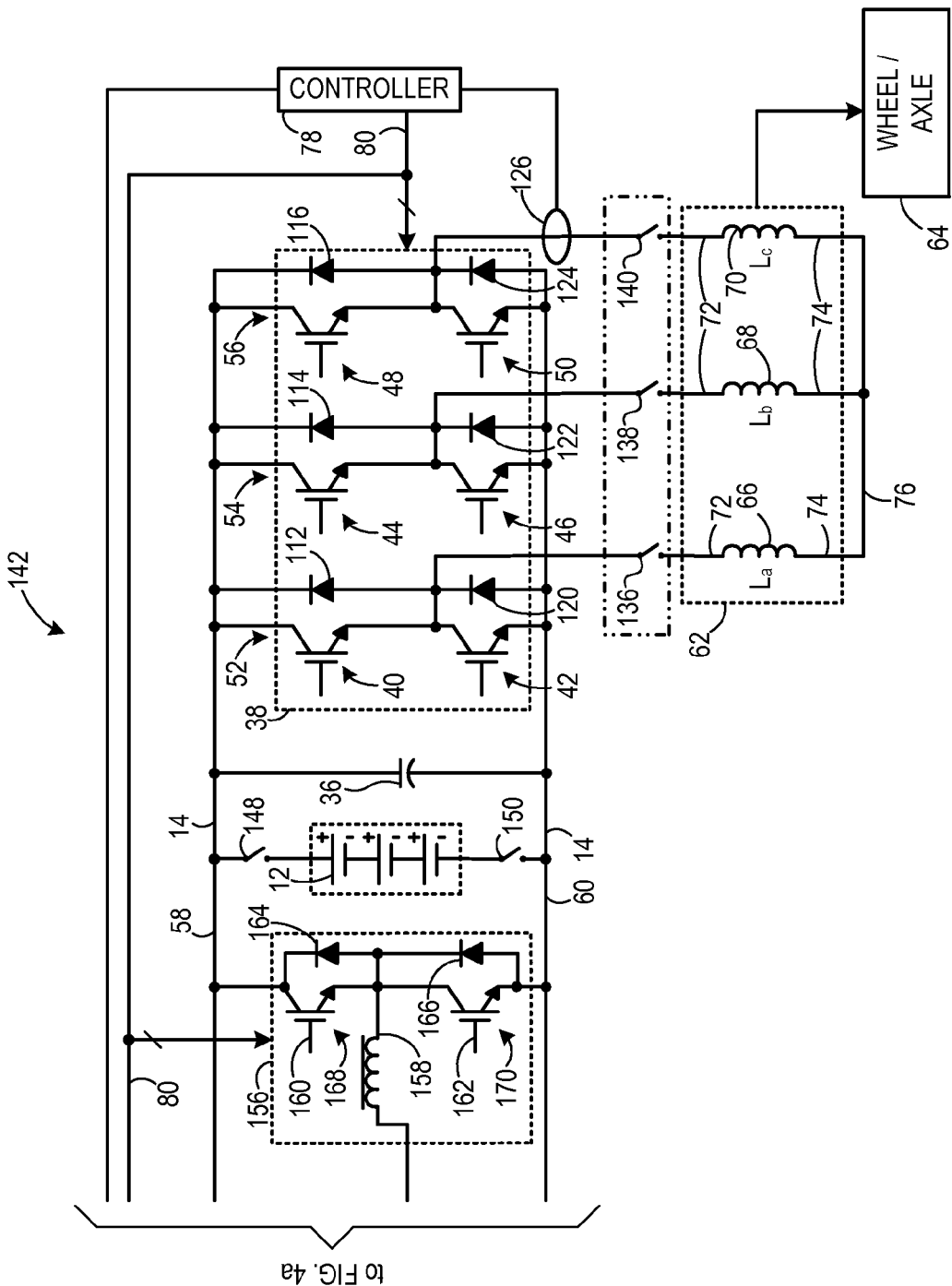

FIGS. 4a and 4b show a schematic diagram of a traction system 172 according to another embodiment of the invention. Elements and components common to traction systems 10, 128, 142, and 172 will be discussed relative to the same reference numbers as appropriate. FIGS. 4a and 4b will also discuss common components of traction system 172 relative to the same reference numbers.

In contrast to traction system 142, contact 108 of plug 102 is coupleable directly to DC bus 14, bypassing the connection thereto through motor 62 and DC-to-AC voltage inverter 38 as illustrated in FIGS. 3a and 3b. Furthermore, first energy storage device 12 is optional, thus allowing traction system 142 to be a one- or a two-battery or energy storage system. Also optional are switches 136-140 that allow controller 78 to decouple motor 62 to avoid rotational movement in motor 62 during the recharging mode as described above.

During the recharging mode of operation, controller 78 is programmed similarly as that described above regarding the control of switches 18, 20, 146 and switches 136-140 (if present) to pre-charge filter capacitor 36 for the first stage and to allow the recharging energy to directly recharge second energy storage device 144 during the second stage. During the third stage, controller 78 controls switches 16, 18 to their open state and controls one or more of bi-directional DC-to-DC voltage converters 152-156 in a bucking mode to regulate the charging of second energy storage device 144 such that its voltage does not exceed a specified level. Bi-directional DC-to-DC voltage converters 152-156 may also be controlled to regulate the recharging voltage on DC bus 14 to a "float voltage" as the recharging current tapers to low levels.

During the motoring and regenerative braking modes of operation, controller 78 may be programmed similarly to that described above with respect to traction system 142.

Embodiments of the invention thus use components such as inverters, converters, resistors, filters and/or machine inductance already on-board a traction control system to recharge one or more energy storage devices of the traction control system. In this manner, these components may be used for the dual purposes of motoring and recharging the energy storage devices. Using the on-board components of the vehicles allows for off-board charging stations to have a simple, low cost, high-power design. In addition, a high-current charging may be obtained in a cost effective manner. Rapid, fast charging of the on-board energy storage devices may be thus accomplished such that a large current flows into the energy storage devices during recharging that is mainly limited by impedance of a voltage transformer alone or in combination with a grid resistor for a portion of the charge period without initial current control by electronic switching elements having higher current limiting properties.

A technical contribution for the disclosed apparatus is that it provides for a controller implemented technique for transferring energy using onboard power electronics.

According to an embodiment of the invention, an apparatus comprises a first energy storage device configured to output a DC voltage and a DC bus coupled to the first energy storage device, the DC bus coupleable to a high-impedance voltage source. The apparatus also comprises a braking resistor coupled to the DC bus and to a control circuit, and a controller. The controller is configured to control the control circuit to cause on the DC bus to be dissipated through the braking resistor during a regenerative braking event, cause the first energy storage device to receive a charging energy from the high-impedance voltage source through the braking resistor during a charging event, and after a threshold value has been crossed, cause the first energy storage device to receive the charging energy from the high-impedance voltage source bypassing the braking resistor during the charging event.

According to another embodiment of the invention, a method of fabricating an energy transfer system for transferring energy between an energy storage device on-board a vehicle and an external source comprises coupling the energy storage device to a voltage bus, the energy storage device configured to output a DC voltage, coupling a regenerative braking dissipation circuit to the voltage bus, and coupling a high-impedance voltage source to the voltage bus to supply current to the energy storage device. The method also comprises configuring a controller to cause the control circuit to dissipate energy on the voltage bus through a resistor of the regenerative braking dissipation circuit during a regenerative braking event, cause the first energy storage device to receive the current from the high-impedance voltage source via the resistor during a first stage of a charging event, and cause the first energy storage device to receive the current from the high-impedance voltage source bypassing the resistor during a second stage of the charging event.

According to yet another embodiment of the invention, a system comprises a DC bus configured to receive charging energy from a high-impedance voltage source, an energy storage device configured to output a DC voltage and coupled to the DC bus, and a resistor coupled to the DC bus. A controller is configured to cause energy on the DC bus to pass through the resistor during a regenerative braking event, to cause the energy storage device to receive a charging energy from the high-impedance voltage source through the resistor during a charging event, and to cause the energy storage device to receive the charging energy from the high-impedance voltage source bypassing the resistor after a time threshold has been crossed during the charging event.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. An apparatus comprising:
a first energy storage device configured to output a DC voltage;
a DC bus coupled to the first energy storage device, the DC bus coupleable to a high-impedance voltage source;
a braking resistor coupled to the DC bus and to a control circuit; and a controller configured to:
    control the control circuit to cause energy on the DC bus to be dissipated through the braking resistor during a regenerative braking event;
    cause the first energy storage device to receive a charging energy from the high-impedance voltage source through the braking resistor during a charging event; and
    after a threshold value has been crossed, cause the first energy storage device to receive the charging energy from the high-impedance voltage source bypassing the braking resistor during the charging event.

2. The apparatus of claim 1 wherein the threshold value comprises a predetermined period of time.

3. The apparatus of claim 1 wherein the controller is further configured to:
    determine one of a state-of-charge and a voltage of the first energy storage device; and
    calculate the threshold value as a period of time based on the one of a state-of-charge and a voltage.

4. The apparatus of claim 1 further comprising a bi-directional DC-to-AC voltage inverter coupled to the first energy storage device and to the DC bus; and
    wherein the controller is further configured to:
        control the bi-directional DC-to-AC voltage inverter to boost the voltage of the charging energy for supply to the DC bus; and
        cause the first energy storage device to receive the boosted charging energy from the DC bus bypassing the braking resistor during the charging event.

5. The apparatus of claim 4 further comprising an electromechanical device coupled to the bi-directional DC-to-AC voltage inverter; and
    wherein the bi-directional DC-to-AC voltage inverter is configured to receive the charging energy from the high-impedance voltage source through the electromechanical device.

6. The apparatus of claim 5 wherein the high-impedance voltage source is coupled to a common node of the electromechanical device.

7. The apparatus of claim 5 wherein the bi-directional DC-to-AC voltage inverter comprises multiple phases; and
    wherein the controller is further configured to control the multiple phases of the bi-directional DC-to-AC voltage inverter to avoid generation of a net torque in the electromechanical device during the charging event.

8. The apparatus of claim 4 further comprising an electromechanical device coupled to a contactor assembly, the contactor assembly coupled to the bi-directional DC-to-AC voltage inverter; and
    wherein the controller is further configured to cause the contactor assembly to decouple the electromechanical device from the bi-directional DC-to-AC voltage inverter during the charging event.

9. The apparatus of claim 1 further comprising a filter capacitor coupled to the DC bus; and
    wherein the controller is further configured to cause the first energy storage device to pre-charge the filter capacitor prior to the charging event.

10. The apparatus of claim 1 wherein the energy storage device has an instantaneous acceptance capability larger than an instantaneous delivery capability of the high-impedance voltage source.

11. The apparatus of claim 1 further comprising:
    a bi-directional DC-to-DC voltage converter coupled to the first energy storage device and to the DC bus; and
    a second energy storage device coupled to the DC bus;
    wherein the controller is further configured to:
        control the bi-directional DC-to-DC voltage converter to buck the voltage and boost the current of the charging energy on the DC bus; and
        cause the second energy storage device to receive the bucked charging voltage from the bi-directional DC-to-DC voltage converter bypassing the braking resistor during the charging event.

12. The apparatus of claim 11 further comprising:
    a bi-directional DC-to-AC voltage inverter coupled to the DC bus;
    an electromechanical device coupled to the bi-directional DC-to-AC voltage inverter; and
    wherein the DC bus is configured to receive the charging energy from the high-impedance voltage source through the bi-directional DC-to-AC voltage inverter and through the electromechanical device.

13. The apparatus of claim 11 wherein the controller is further configured to cause charging energy from the high-impedance voltage source to simultaneously charge the first and second energy storage devices.

14. A method of fabricating an energy transfer system for transferring energy between an energy storage device on-board a vehicle and an external source, the method comprising:
    coupling the energy storage device to a voltage bus, the energy storage device configured to output a DC voltage;
    coupling a regenerative braking dissipation circuit to the voltage bus;
    coupling a high-impedance voltage source to the voltage bus to supply current to the energy storage device; and
    configuring a controller to:
        cause the control circuit to dissipate energy on the voltage bus through a resistor of the regenerative braking dissipation circuit during a regenerative braking event;
        cause the first energy storage device to receive the current from the high-impedance voltage source via the resistor during a first stage of a charging event; and
        cause the first energy storage device to receive the current from the high-impedance voltage source bypassing the resistor during a second stage of the charging event.

15. The method of claim 14 wherein the first stage is prior to the second stage.

16. The method of claim 14 further comprising:
    coupling a bi-directional DC-to-AC voltage inverter to the energy storage device and to the voltage bus;
    coupling an electromechanical device coupled to the bi-directional DC-to-AC voltage inverter; and
    wherein coupling the high-impedance voltage source to the voltage bus comprises coupling the high-impedance voltage source to the voltage bus via the bi-directional DC-to-AC voltage inverter and via the electromechanical device.

17. The method of claim 16 further comprising configuring the controller to:
    boost the current from the high-impedance voltage source via the bi-directional DC-to-AC voltage inverter and via the electromechanical device for supply to the voltage bus; and
    cause the first energy storage device to receive the boosted current from the voltage bus during a third stage of the charging event.

18. The method of claim 14 further comprising:
coupling a bi-directional DC-to-DC voltage converter to the energy storage device and to the voltage bus;
coupling a second energy storage device to the DC bus; and
configuring the controller to:
  buck the current from the high-impedance voltage source via the bi-directional DC-to-DC voltage converter; and
  cause the second energy storage device to receive the bucked current during a third stage of the charging event.

19. A system comprising:
a DC bus configured to receive charging energy from a high-impedance voltage source;
an energy storage device configured to output a DC voltage and coupled to the DC bus;
a resistor coupled to the DC bus; and
a controller configured to:
  cause energy on the DC bus to pass through the resistor during a regenerative braking event;
  cause the energy storage device to receive a charging energy from the high-impedance voltage source through the resistor during a charging event; and
  cause the energy storage device to receive the charging energy from the high-impedance voltage source bypassing the resistor after a time threshold has been crossed during the charging event.

20. The system of claim 19 further comprising:
a first switch coupled between the energy storage device and the DC bus;
a second switch coupled between the energy storage device and the resistor;
wherein the controller, in being configured to cause the energy storage device to receive the charging energy from the high-impedance voltage source through the resistor during the charging event, is configured to open the first switch and to close the second switch; and
wherein the controller, in being configured to cause the energy storage device to receive the charging energy from the high-impedance voltage source bypassing the resistor after the time threshold has been crossed during the charging event, is configured to close the first switch and to open the second switch.

21. The system of claim 19 further comprising:
a bi-directional DC-to-AC voltage inverter coupled to the energy storage device and to the DC bus;
an electromechanical device coupled to the bi-directional DC-to-AC voltage inverter; and
wherein the controller is further configured to:
  control the bi-directional DC-to-AC voltage inverter to boost one of the voltage and the current of the charging energy for supply to the DC bus; and
  cause the energy storage device to receive the boosted charging energy from the DC bus during the charging event.

22. The system of claim 19 further comprising:
a bi-directional DC-to-DC voltage converter coupled to the energy storage device and to the DC bus; and
a second energy storage device coupled to the DC bus;
wherein the controller is further configured to:
  control the bi-directional DC-to-DC voltage converter to buck one of the voltage and the current of the charging energy on the DC bus; and
  cause the second energy storage device to receive the bucked charging energy from the bi-directional DC-to-DC voltage converter bypassing the braking resistor during the charging event.

* * * * *